United States Patent [19]

Edlin et al.

[11] Patent Number: 4,748,629
[45] Date of Patent: May 31, 1988

[54] PHASE LOCKED RF LINAC FREE ELECTRON LASER

[75] Inventors: George R. Edlin; Robert W. Jones; James F. Perkins, all of Huntsville, Ala.

[73] Assignee: The United States of America as represented by the Secretary of the Army, Washington, D.C.

[21] Appl. No.: 131,476

[22] Filed: Dec. 10, 1987

[51] Int. Cl.⁴ .............................................. H01S 3/00
[52] U.S. Cl. ........................................ 372/2; 372/93; 372/102; 372/82; 372/18
[58] Field of Search ..................... 372/18, 93, 94, 102, 372/99, 108, 82, 2, 98

[56] References Cited

U.S. PATENT DOCUMENTS

| | | | |
|---|---|---|---|
| 3,822,410 | 7/1974 | Madey | 331/94.5 |
| 4,287,488 | 9/1981 | Bran et al. | 372/2 |
| 4,479,218 | 10/1984 | Bran et al. | 372/2 |
| 4,703,228 | 10/1987 | Wese | 372/26 |

*Primary Examiner*—Léon Scott, Jr.
*Attorney, Agent, or Firm*—Freddie M. Bush; James T. Deaton

[57] ABSTRACT

A radio frequency linear acceleration free electron laser is provided by mixing the pulses in such a time delay manner to phase lock the device and produce phase correlation between the laser pulses.

4 Claims, 1 Drawing Sheet

PHASE LOCKED RF LINAC FREE ELECTRON LASER

DEDICATORY CLAUSE

The invention described herein may be manufactured, used, and licesnsed by or for the Government for governmental purposes without the payment to us of any royalties thereon.

BACKGROUND OF THE INVENTION

A very important property of lasers is that they typically have a relatively long coherence length (or, equivalently, coherence time), as compared to standard incoherent sources. This is a very important property when a given wavefront which is produced by the same source at a later time, such as in constructing an interferogram with an unequal path length interferometer or in many applications of holography. Laser sources having coherence lengths of from meters to kilometers are well known. These devices are generally of low power (milliwatts to watts), utilized for photographic exposure techniques applicable to holography or interferometry.

Coherence is also an important factor for certain high energy lasers. This can be a result of using large optical elements required to focus the high energy laser (HEL) beam over hundreds to thousands of kilometers down to a reasonably small diameter (tens of centimeters) on the target of interest. The diameter, d, of a circular mirror which focuses down to a spot size of X at a distance Z, for a wavelength $\lambda$ (all expressed in meters) is given by the expression $d = 2.44 \, (\lambda Z)/X$. As an example, for a wavelength of 1 micrometer, a focal distance of 1,000 kilometers, and a focal spot of 30 cm (0.3 meters), the mirror diameter, d, is 8.13 meters. Mirrors of this size are currently conceived of as being segmented, i.e., composed of several separate segments, each of which is flat or nearly flat. Each segment is independently directable to a given target and each segment must be phase matched to every other segment for optical focusing on a target.

Phase matching of segments can occur even with a beam which is incoherent provided (1) each segment is illuminated with a portion of the beam from the same single source, and (2) the path length from the source to each mirror segment is the same. For some applications one wished to relax requirement (1); this may lead to requirements that each output source be individually coherent (have a relatively long coherence length) and that mutual coherence of the various sources be achieved by some special means of phase locking. Possible methods of phase locking of physically separate radiation sources have been considered by various workers, but are not the subject of this invention.

Accordingly, there is a need for an invention which is concerned with situations in which condition (2) named above is violated, i.e., situations in which the path length from the source to various output mirror segments is not necessarily the same. In order that the beams from various segments combine coherently and be focusable to a high degree, it is then essential that the beams falling on each segment shall individually have relatively long coherence lengths (at least as long as the differences in path lengths to various mirror segments). In the situations encountered prior to the invention of RF Linac Free Electron Lasers, this requirement amounted to requiring a laser type source or sources in order to produce a coherent beam, and in the case of multiple lasers required means of phase locking the various lasers together. A different problem arises from RF Linac FELs. For brevity, these will sometimes be referred to as RFFELs.

An inherent property of RFFELs is that high energy electrons which pass through the wiggler magnets producing laser gain, and also the photons involved in the lasing action, consist of extremely short micropulses (typically 30 picoseconds) which are spaced apart in time by a somewhat larger interval than the micropulse width, but one which is nevertheless rather short. A typical time between pulses is 10 nanoseconds. Considering that the photons travel essentially at the speed of light in vacuum and that the electron bunches travel at a speed only very slightly less, it follows that there are micropulses of photon of length of typically 0.9 centimeters, separated by intervals (micropulse separation distance) of typically 300 centimeters. We primarily consider here operation as a ring resonator, though the general situation would also apply in a standing wave resonator. The overall design must be such that the round trip path length (of photons) in the resonator is an integer multiple of the micropulse separation distance, in order that the relatively short micropulses of gain in the wiggler be present at just those intervals of time when a micropulse of photons passes through. (For brevity we designate this integer by N). This is well recognized and incorporated in designs. If the integer multiple, N, were simply unity, the problem addressed in this invention would not arise.

A particular problem arises for RFFELs because the round trip path length in the resonator is, for practical reasons, somewhat longer than the micropulse separation time; hence the integer N is larger than unity (perhaps falling between 10 and 100). It is inherent in the operation of a resonator that there will be mutual coherence of any set of micropulses which are separated by a multiple of N. Hence there are sets of micropulses such that each set is coherent within itself. The micropulses thus become naturally (logically) separated into sets of micropulses, such that each set is coherent, but there does not exist mutual coherence between members of any two distinct sets of micropulses. As a simple example the set of micropulses numbered $(1, N+1, 2N+1...)$ is not coherent with the set of micropulses numbered $(2, N+2, 2N+2, ...)$. The purpose of this invention is to arrange that various such sets of micropulses are mutually coherent. The practical importance is that output mirror segments can be fed by beams from the RFFEL which differ in path length by the micropulse separation interval (typically some 3 meters), or any integer multiple thereof. Without use of this invention the path length difference between beams to separate mirror segments would have to be an integer multiple of the resonator round trip length, which is typically much larger (perhaps many tens of meters).

SUMMARY OF THE INVENTION

The Phase Locked Radio Frequency Linac Free Electron Laser (PLRFFEL) comprises an arrangement of optical elements which provide a degree of coherence which is not present in an ordinary Radio Frequency Linac Free Electron Laser (RFFEL). Specifically there is mutual coherence between all micropulses throughout one overall period of operation (which could be essentially infinite in cw operation or of the order of hundreds of microseconds in macropulsed operation). This additional coherence is obtained by introducing optical coupling means whereby part of the radiation from one micropulse is introduced into a micropulse which is later by an amount of time which is less than the resonator round trip time. (By contrast, an ordinary RFFEL specifically involves a time delay which must necessarily be specifically the resonator round trip time). The additional time delay will be only one or at most a very few units of the micropulse spacing time. The additional mutual coherence produced by this invention makes it possible to obtain coherence of separate sub-beams which may be propagated to segmented output mirrors with path length differences which need only be some multiple (possibly unity) of the micropulse spacing time. Without use of this invention such path length differences would need to be multiples of the resonator round trip time, which is a much larger time delay. There are also other advantages to the additional degree of coherence which is obtained by this invention.

DESCRIPTION OF THE PREFERRED EMBODIMENT

Figure 1:
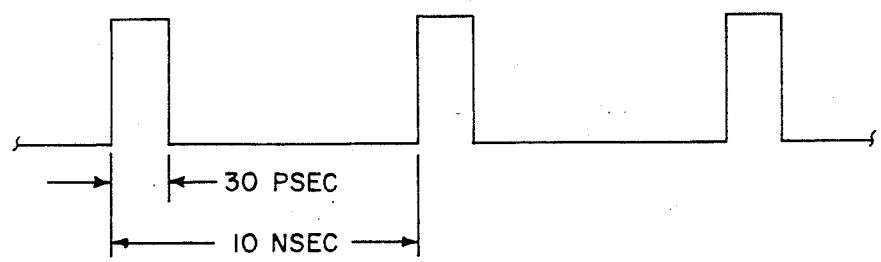
FIG. 1 illustrates a schematic plot of the circulating optical intensity of a RFFEL as a function of time.

Referring now to FIG. 1 of the drawing in which certain quantitative features of a RFFEL of a type such as disclosed in U.S. Pat. No. 3,822,410, July 2, 1974 are quite significant. The output from a RFFEL is illustrated as consisting of a series of micropulses whose time duration is extremely short such as a typical value of 30 picoseconds as indicated, and a typical micropulse separation time of 10 nanoseconds, which time is much less than the optical round trip time in the resonator.

Figure 2:
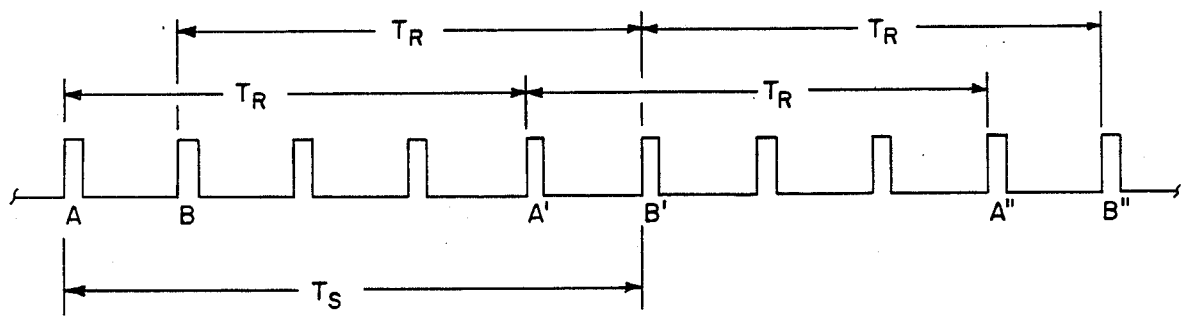
FIG. 2 illustrates schematically a plot of the circulating optical flux and illustrating typical resonator round trip time.

In FIG. 2 a schematic plot of the circulating optical flux of a RFFEL is illustrated and above the plot of pulses is indicated, in a schematic way only, the fact that the resonator round trip time $T_R$ is a substatial multiple of the micropulse separation time. As a result, various sets of micropulses (e.g. A, A', A" ...; B, B', B" ...) are optically coupled together and hence are mutually coherent within each set (e.g. A or B set). But one set is not coherent with any other set in an ordinary RFFEL. At the bottom of the plot of pulses is indicated the total propagation time $T_S$ of an additional beam in the PLRFFEL of this invention. This has the effect of optically connecting all micropulses, and hence all micropulses will have mutual optical coherence. That is, the mixing of portions of the pulses by the PLRFFEL ultimately causes each of the pulses produced to be phase locked.

Figure 3:
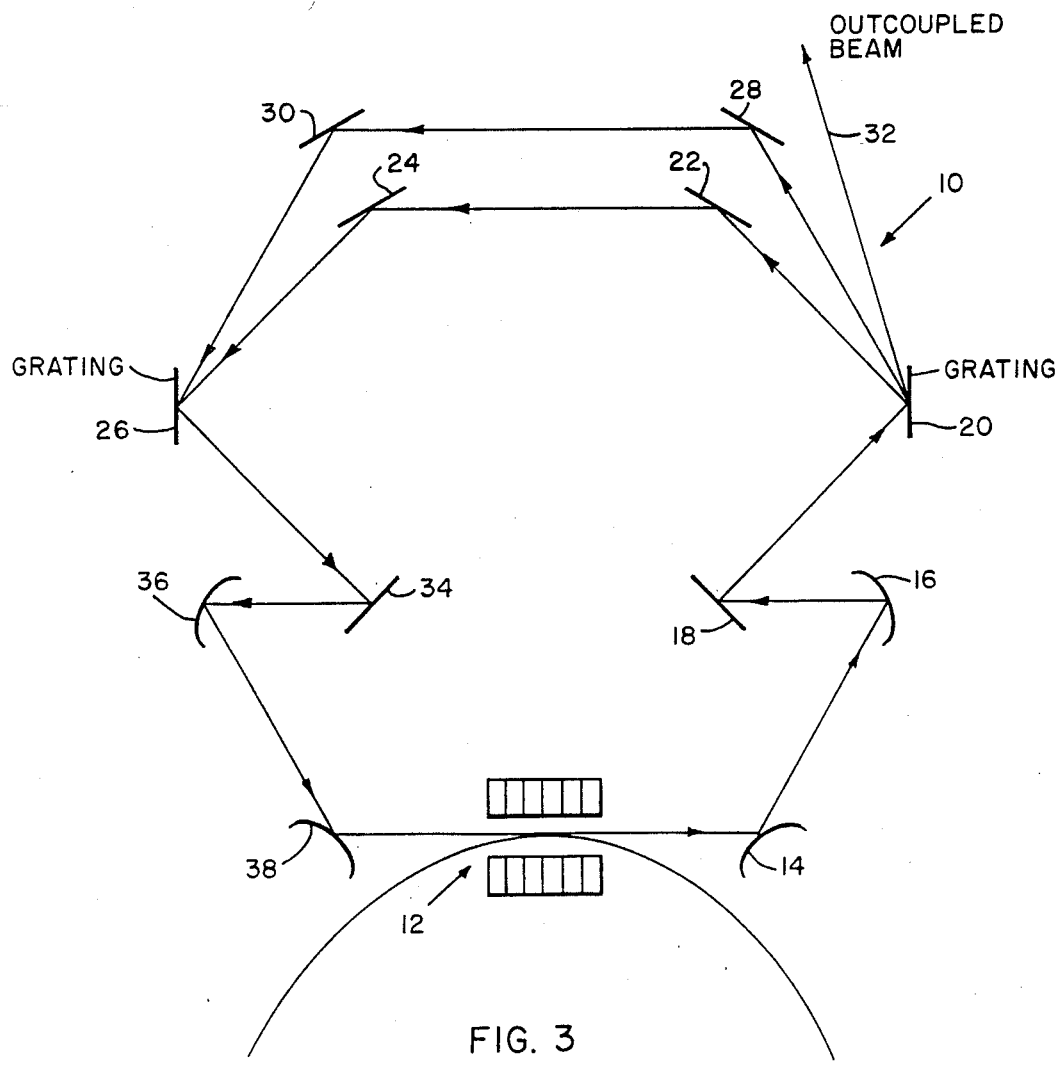
FIG. 3 illustrates schematically an optical layout of a PLRFFEL in accordance with this invention.

Referring now to FIG. 3, which schematically illustrates an optical layout of a PLRFFEL 10, this layout illustrates one particular manner in which an additional optical feedback loop is utilized such that the delay time exceeds the ordinary resonator round trip time by an amount which is set at a multiple (preferably unity) of the micropulse spacing time. Typical PLRFFEL layout 10 includes a conventional wiggler laser arrangement 12 that produces a laser beam in the form of pulses that are reflected from convex mirror 14 to concave mirror 16 to expand the laser beam and act as a grazing telescope to enlarge the propagating beam after it emerges from the wiggler. Mirror 18 is a flat turning mirror that acts to reflect the expanded beam onto diffraction grating 20 and diffraction grating 20 reflects a major portion of about 40 to about 89% to flat mirror 22, a minor portion of about 1 to about 10% to flat mirror 28 and a substantial portion of about 10 to about 50% as output beam 32. The portion that is reflected to mirror 22 is further reflected to flat mirror 24 and then to recombining diffraction grating 26 in a return path to flat mirror 34, concave mirror 36 and convex mirror 38 to wiggler laser 12. Concave and convex mirrors 36 and 38 form a recompressing telescope for reducing the beam back to suitably small dimensions before being reintroduced into the wiggler laser 12. The mirror portion of the beam that is reflected to flat mirror 28 and then to flat mirror 30 for recombining at diffraction grating 26 is time delayed by an amount which exceeds that of the resonator round trip time by an integer multiple (unity for the case of mutual coherence of all micropulses) of the micropulse spacing. Thus the length of the optical path from 20, 28, 30, 26 exceeds that of the main beam path from 20, 22, 24, 26 by an amount which equals the speed of light times a multiple of the micropulse separation time. This time delay causes the micropulses to mix and to be phase locked.

As illustrated, diffraction grating 20 is used to divide the beam, and diffraction grating 26 is used to recombine the beam; however, if desired other means could be used such as scraper mirror, beam splitter, and etc.

In operation, the beam produced at wiggler laser 12 is expanded by mirrors 14 and 16, reflected from flat mirror 18 to dividing means 20 which reflects a major portion to mirror 22, a minor portion to mirror 28 and a substantial portion to output 32. The portion reflected to mirror 22 is reflected onto mirror 24 and then to recombining means 26. The minor portion reflected to mirror 28 and then to mirror 30 is delayed by an amount which equals the speed of light times a multiple of the micropulse separation time. That is, the minor portion will be added back to a pulse which is later by at least the separation between the pulse from which it was divided and the next succeeding pulse. The combined pulse portions at combining means 26 are then transmitted and reduced by mirrors 34, 36 and 38 back into laser wiggler 12 to ultimately produce an output at 32 that is phase locked. If the minor portion in optical path 20, 28, 30, and 36 is blocked, phase locking is destroyed and the device will then operate to produce an output similiar to an ordinary RFFEL in which the pulses are not phase locked.

We claim:

1. A phase locked radio frequency linac free electron laser comprising a wiggler laser arrangement for producing a propogating laser beam in the form of mircopulses, means for expanding the laser beam to enlarge the propagating beam after it emerges from the laser wiggler, means for dividing said expanded laser beam into a major portion, a minor portion and a substantial output portion, first reflector means for reflecting said major portion about a path to recombining means, second reflector means for reflecting said minor portion about a path to said recombining means, said path for reflecting said minor portion being longer than said path for reflecting said major portion to delay said minor portion in time by at least the spacing between adjacent pulses of said micropulses to cause said micropulses to mix and phase lock, and recompressing means for receiving the beam from the recombining means to reduce the beam and then reintroduce the beam into the wiggler laser.

2. A phase locked radio frequency linac free electron laser as set forth in claim 1, wherein said dividing means and said recombining means are diffraction gratings.

3. A phase locked radio frequency linac free electron laser as set forth in claim 2, wherein said means for expanding the laser beam are concave and convex mirrors that act as a grazing telescope and said recompressing means includes convex and concave mirrors that act as a recompressing telescope to reduce the beam in size for reintroduction into the wiggler laser.

4. A phase locked radio frequency linac free electron laser as set forth in claim 3, wherein said first reflector means includes flat mirrors for reflecting said major portion about said path and said second reflector means includes flat mirrors for reflecting said minor portion about said path to said recombining means.

* * * * *